United States Patent [19]
Saito et al.

[11] Patent Number: 4,467,465
[45] Date of Patent: Aug. 21, 1984

[54] ROTARY RECORDING MEDIUM REPRODUCING APPARATUS HAVING A JACKET OPENING ENLARGING MECHANISM

[75] Inventors: Takashi Saito, Ayase; Toshio Hirano, Atsugi, both of Japan

[73] Assignee: Victor Company of Japan, Ltd., Yokohama, Japan

[21] Appl. No.: 436,849

[22] Filed: Oct. 26, 1982

[30] Foreign Application Priority Data

Oct. 30, 1981 [JP] Japan ............................ 56-162089[U]

[51] Int. Cl.³ .......................... G11B 3/10; G11B 3/58; G11B 17/04
[52] U.S. Cl. .................................................... 369/77.2
[58] Field of Search ......................................... 369/77.2

[56] References Cited

U.S. PATENT DOCUMENTS

| | | | |
|---|---|---|---|
| 4,358,841 | 11/1982 | Carroll et al. ...................... | 369/77.2 |
| 4,395,744 | 7/1983 | Saito et al. ........................... | 360/133 |
| 4,413,333 | 11/1983 | Saito .................................... | 369/77.2 |

FOREIGN PATENT DOCUMENTS

2083268  3/1982  United Kingdom ............... 369/77.2

*Primary Examiner*—Steven L. Stephan
*Attorney, Agent, or Firm*—Louis Bernat

[57] ABSTRACT

A rotary recording medium reproducing apparatus reproduces a rotary recording medium on a turntable after an operation is performed in which the case accommodating the rotary recording medium therein is inserted into the reproducing apparatus and the case is then extracted from the reproducing apparatus with leaving the rotary recording medium with the apparatus. The reproducing apparatus comprises a jacket opening enlarging mechanism for engaging with the jacket to enlarge the opening according to the movement of the enlarging mechanism towards the innermost part of the reproducing apparatus from an inserting opening according to the insertion of the case, and a locking mechanism provided at a position substantially center along right and left directions of the enlarging mechanism, for normally locking the enlarging mechanism in the vicinity of the inserting opening to restrict the movement of the enlarging mechanism towards the innermost part of the reproducing apparatus. The locking mechanism is maintained in its original locking state upon insertion of the case or jacket in a state where a front edge of the case or jacket is slanted with respect to the enlarging mechanism, and assumes a locking released state only when the front edge is parallel with the enlarging mechanism and the locking mechanism is pushed by the front edge.

7 Claims, 9 Drawing Figures

ROTARY RECORDING MEDIUM REPRODUCING APPARATUS HAVING A JACKET OPENING ENLARGING MECHANISM

BACKGROUND OF THE INVENTION

The present invention generally relates to rotary recording medium reproducing apparatuses capable of placing and leaving a rotary recording medium in a state possible for reproduction within the reproducing apparatus when a jacket having a lid for accommodating the recording medium therein is inserted into and then extracted from within the reproducing apparatus, and also capable of incasing the recording medium within the jacket so that the recording medium can be obtained outside the reproducing apparatus together with the jacket, when the empty jacket is inserted into and then extracted from within the reproducing apparatus. More particularly, the present invention relates to the above type of a rotary recording medium reproducing apparatus having a jacket opening enlarging mechanism for enlarging an opening of the jacket which is inserted into the reproducing apparatus upon loading and unloading of the recording medium with respect to the reproducing apparatus, wherein the jacket opening enlarging mechanism is provided with a locking mechanism which is maintained in a locked state even upon insertion of the case or the jacket if the insertion is not normal and is released of the locked state only when the case or the jacket is inserted in a normal position.

Conventionally, in an apparatus for reproducing a rotary recording medium (referring to a video disc, PCM audio disc, and the like, and hereinafter simply referred to as a disc), there are types of apparatuses in which the disc is reproduced when the disc is loaded upon clamping and placing of the disc within the reproducing apparatus, by inserting into and then extracting a jacket (disc case) which has a lid and accommodates a disc therein, from within the reproducing apparatus. As a conventional apparatus of this type, a reproducing apparatus was proposed in a U.S. patent application Ser. No. 231,868 filed Feb. 5, 1981, entitled DISC-SHAPED RECORDING MEDIUM REPRODUCING APPARATUS, now U.S. Pat. No. 4,352,174, in which the assignee is the same as that of the present application. This previously proposed reproducing apparatus operates together with a disc case comprising a jacket which has a space for accommodating a disc and an opening for allowing the disc to go in and out of the jacket, and a lid member inserted through the jacket opening for closing the jacket opening, where the reproducing apparatus comprises an inserting opening through which the case is inserted, a turntable for rotating the disc, holding means for holding at least one of the disc and the lid member provided at an innermost part on the opposite side from the inserting opening with respect to the turntable, a jacket opening enlarging mechanism provided in the vicinity of the inserting opening, capable of moving over the turntable between the position in the vicinity of the inserting opening and the innermost part of the reproducing apparatus, for enlarging the jacket opening by entering inside cutouts of the lid member upon insertion of the jacket into the reproducing apparatus through the inserting opening, lowering and raising means for lowering the disc to a position where the disc is placed on the turntable from a holding position where the disc is held by the holding means upon starting of the reproduction, and raising the disc to the holding position from the turntable upon finishing or discontinuing of the reproduction, a reproducing transducer for reproducing the disc placed onto the turntable, and moving means for moving the reproducing transducer from a waiting position to a reproducing position with respect to the disc.

In the above previously proposed reproducing apparatus, a locking mechanism is provided for locking the jacket opening enlarging mechanism in the vicinity of the inserting opening. This locking mechanism is provided in order to prevent the enlarging mechanism from moving, when the reproducing apparatus receives a shock upon transport or the operator pushes the enlarging mechanism by his finger tips in mischief, for example. The locking mechanism is independently provided on both the right and left end sides of the enlarging mechanism. These locking mechanisms are simultaneously released by being pushed by the case, when the case is inserted through the inserting opening, to allow the enlarging mechanisms to move according to the insertion of the case.

On the other hand, if the manner in which the case is inserted into the reproducing apparatus, it is normal for the case to be inserted straight in a position where the front surface edge thereof is parallel with the enlarging mechanisms. However, in some instances, the case may be inserted into the reproducing apparatus in a special manner, in which the rear edge of the case along the inserting direction which is held by the operator is repeatedly swung to the right and left. During such a special case inserting operation, the right and left locking mechanisms are released alternately, and one of the locking mechanisms constantly remain in the locking state. Hence, the enlarging mechanism is maintained in the locked state and usually does not move, although the locking provided by the locking mechanisms is incomplete. However, if the case is swung swiftly, for example, the following movement of the locking mechanisms towards the returning direction is delayed, and the right and left locking mechanisms both assume the lock releasing state. As a result, the locking with respect to the enlarging mechanism is released, and the enlarging mechanism is pushed by the case and is caused to move towards the innermost part of the reproducing apparatus. On the other hand, as will be described hereinafter, the positional relationship between the case and the enlarging mechanism in the above state becomes such that the front edge of the case is inclined with respect to the enlarging mechanism. That is, the enlarging mechanism may assume a state where one or both pairs of enlarging fingers of the enlarging mechanism do not engage with the opening of the inserted jacket, for example, that is, the enlarging mechanism may assume a state deviated from the normal state. Under such circumstances, even when the enlarging mechanism operates, the enlarged state of the jacket opening may become incomplete, or the jacket opening may not be enlarged at all. If the case or the jacket is inserted in a state where the enlarged state of its opening is incomplete, the loading of the disc into the reproducing apparatus and the recovery of the disc within the jacket cannot be carried out in a normal manner, and abnormal loading and recovery of the disc takes place. Moreover, an accident may occur in which the recording surface of the disc is scratched by the jacket when the disc enters and leaves the jacket.

SUMMARY OF THE INVENTION

Accordingly, it is a generally object of the present invention to provide a novel and useful rotary recording medium reproducing apparatus having a jacket opening enlarging mechanism, in which the above described problems have been eliminated.

Another and more specific object of the present invention is to provide a rotary recording medium reproducing apparatus comprising a mechanism for locking jacket opening enlarging means at an original position in the vicinity of a case inserting opening, wherein the mechanism is provided substantially center along right and left direction of the enlarging means, so that the locking with respect to the enlarging means is only released when a case or jacket is inserted in a normal manner. According to the reproducing apparatus of the present invention, the case or jacket will not be inserted into the reproducing apparatus in a state where the opening of the case or jacket is closed or in an incompletely enlarged state. Therefore, abnormal loading and recovery of the disc is prevented, and further, accidents in which the disc is damaged are positively prevented.

Other objects and further features of the present invention will be apparent from the following detailed description when read in conjunction with the accompanying drawings.

DETAILED DESCRIPTION

Figure 1:
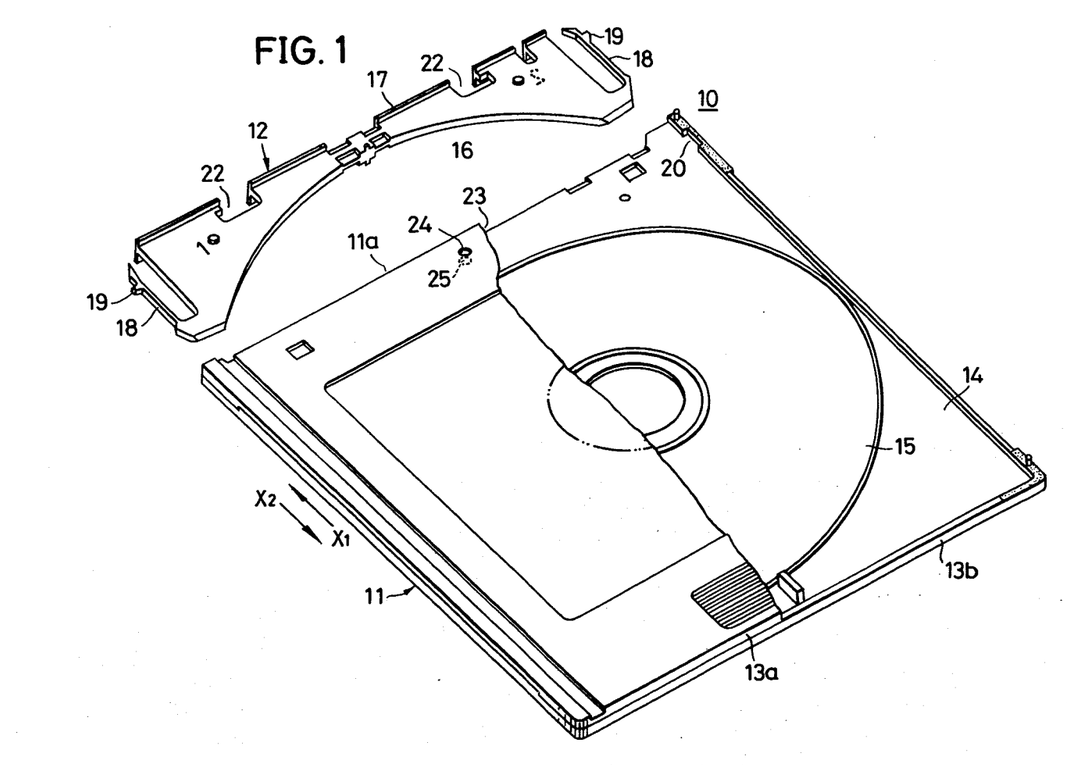
FIG. 1 is a perspective view, with a part cut away and disassembled, showing an example of a disc case which operates together with a rotary recording medium reproducing apparatus according to the present invention.

In FIG. 1, a disc case 10 comprises a jacket 11 and a lid plate 12. The jacket 11 is assembled from a pair of jacket halves 13a and 13b, and comprises a flat cavity or space 14 therein. This space 14 is open at an opening 23 at the front of the jacket 11, and accommodates a disc 15. The lid plate 12 comprises a plate-shaped main lid body 16, and a rim portion 17 formed unitarily at the front edge of the main lid body 16. A pair of engaging arms 18 are formed on both sides of the main lid body 16. The main lid body 16 of the lid plate 12 is inserted into a predetermined position within the jacket 11. Moreover, projections 19 of the engaging arms 18 engage into depressions 20, and thus, the lid plate 12 engages with the jacket 11.

Figure 2:
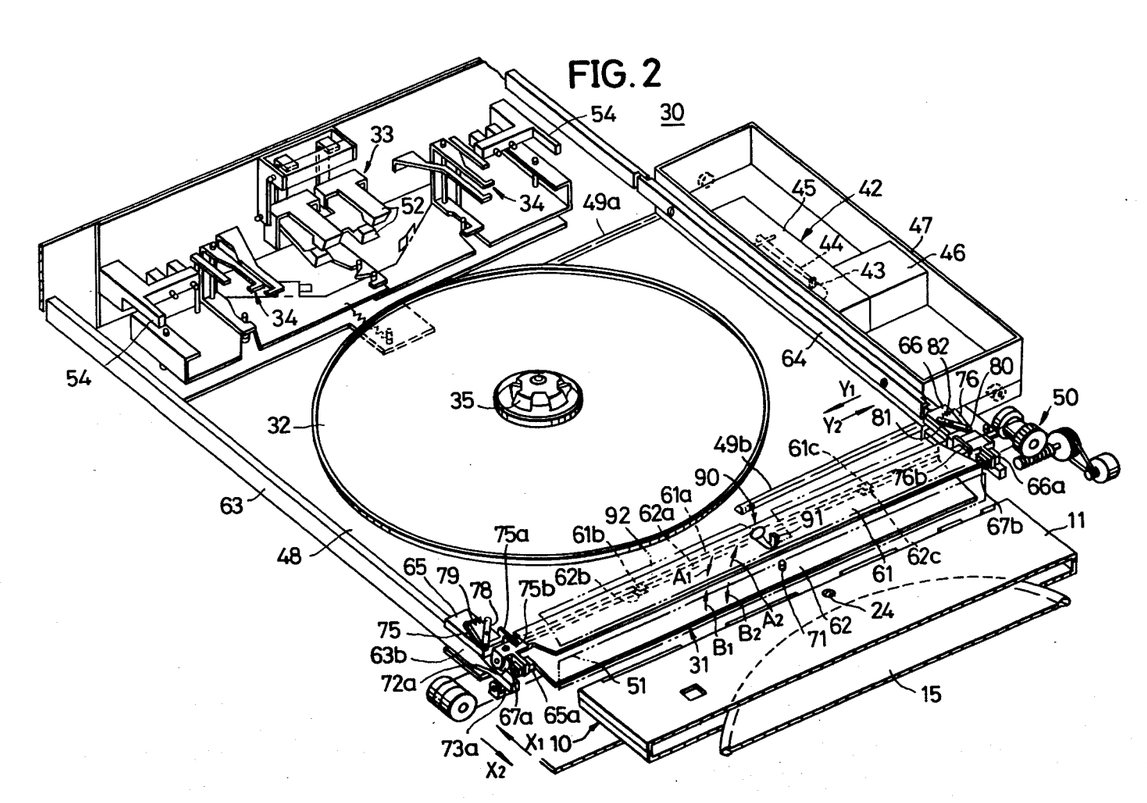
FIG. 2 is a perspective view, with a part cut away, showing the inner construction of an embodiment of a rotary recording medium reproducing apparatus according to the present invention.

As shown in FIG. 2, a reproducing apparatus 30 substantially comprises a jacket opening enlarging mechanism 31 which constitutes an essential part of the reproducing apparatus according to the present invention, a turntable 32 for rotating the disc 15 placed thereon, a disc clamping mechanism 33 for clamping the disc 15, a lid plate locking mechanism 34 for locking the lid plate 12, and the like.

A reproducing transducer 42 comprises a pickup device 45 including a cantilever 44 provided with a reproducing stylus 43 at the tip end thereof, a resonator 46, and the like, and is mounted to a carriage 47. The carriage 47 is transferred in the directions of arrows Y1 and Y2 by means of a transferring mechanism 50, in a state where rollers provided on the carriage 47 roll along rails 49a and 49b which are respectively provided on a chassis 48.

The disc clamping mechanism 33 is provided at the inner part of the reproducing apparatus 30 on the opposite side of an inserting opening 51, and comprises a pair of upper and lower clamping fingers 52.

Upon reproduction of the disc 15, the disc case 10 is inserted through the inserting opening 51 of the reproducing apparatus 30, by inserting the disc case 10 with the side of the lid plate 12 into the direction of an arrow X1.

When the disc case 10 is inserted into the reproducing apparatus 30 in the above described state, the jacket opening enlarging mechanism 31 is pushed in the direction of the arrow X1 by the disc case 10. As the jacket opening enlarging mechanism 31 moves, the front part of the upper and lower jacket halves 13a and 13b are enlarged upwards and downwards, to enlarge the opening 23 as will be described hereinafter.

When the disc case 10 is inserted into the innermost part of the reproducing apparatus 30 together with the enlarging mechanism 31 over the turntable 32, cutouts 22 of the lid plate 12 becomes locked by the lid plate locking mechanism 34. Hence, the lid plate 12 is locked and held at the innermost part of the reproducing apparatus 30.

In addition, engagement releasing members 54 enter inside the openings on the right and left sides of the disc case 10, and push sloping surfaces at the tip ends of the engaging arms 18. Accordingly, the engaging arms 18 are respectively distorted inwards, and the projections 19 respectively slip out from the depressions 20, to release the engagement of the lid plate 12 with respect to the jacket 11. Further, the disc 15 is clamped at a predetermined height by the clamping fingers 52.

Next, the jacket 11 is extracted in the direction of an arrow X2. Since the lid plate 12 and the disc 15 are respectively locked and clamped as described above, only the jacket 11 is moved in the direction of the arrow X2, leaving behind the lid plate 12 and the disc 15. Accompanied by this extraction of the jacket 11, the lid plate 12 and the disc 15 are relatively extracted from within the jacket 11. In a state where the jacket 11 is completely extracted from the reproducing apparatus 30, the disc 15 is supported horizontally at a position directly above the turntable 32.

When a play operation is carried out thereafter, the disc 15 is lowered and placed onto the turntable 32, and is clamped by a disc clamping mechanism 35. In addition, the disc 15 is rotated clockwise together with the turntable 32.

Moreover, the carriage 47 moves in the direction of the arrow Y1 from a waiting position, to reproduce the information signal by the reproducing stylus 43 which relatively scans over the recording surface of the disc 15.

Next, description will be given with respect to an operation in which the disc 15 is recovered from within the reproducing apparatus 30.

Upon completion of the reproducing operation, the disc 15 is pushed upwards. Further, the disc 15 thus pushed upwards, is clamped by the disc clamping mechanism 33.

Upon recovery of the disc 15, an empty jacket 11 is again inserted into the reproducing apparatus 30 through the inserting opening 51, with the opening of the jacket 11 first. Hence, the enlarging mechanism 31 is pushed by the jacket 11 and moves in the direction of the arrow X1, to enlarge the opening of the jacket 11. As the jacket 11 is inserted along the direction of the arrow X1, the disc 15 is relatively inserted into the jacket 11 through the opening of the jacket 11.

When the jacket 11 is inserted into the innermost position within the reproducing apparatus 30, the disc 15 becomes completely incased within the jacket 11, and further, the locked lid plate 12 is relatively inserted within the opening of the jacket 11.

As the jacket 11 is inserted into a final position, the disc 15 becomes accommodated within the jacket 11, and the main part of the lid plate 12 which has been locked, becomes inserted inside the jacket opening. Furthermore, the lid plate locking mechanism 34 releases the lid plate 12.

Therefore, when the jacket 11 is extracted in the direction of the arrow X2, the lid plate 12 then moves in the direction of the arrow X2 together with the jacket 11, and the disc 15 is pushed by the lid plate 12 and becomes forcibly pushed out in the direction of the arrow X2 by the holding part thereof. Accordingly, the disc 15 separates from the reproducing apparatus 30 to become recovered within the disc case 10.

Next, description will be given with respect to an embodiment of a jacket opening enlarging mechanism which constitutes an essential part of the reproducing apparatus according to the present invention, by referring to FIG. 3 and the following figures. In each of these figures, those parts which are the same as those corresponding parts in FIGS. 1 and 2 are designated by the same reference numerals, and their description will be omitted.

The jacket opening enlarging mechanism 31 is substantially constructed from elongated upper and lower enlarging members 61 and 62 extending in the directions of the arrows Y1 and Y2, and sliders 65 and 66 respectively fitted on guide rails 63 and 64. The sliders 65 and 66 respectively support both ends of the above enlarging members 61 and 62. In accordance with the insertion and extraction of the disc case 10, the above jacket opening enlarging mechanism 31 moves in the directions of the arrows X1 and X2 under the guidance provided by the guide rails 63 and 64, passing above the turntable 32 between a position in the vicinity of the inserting opening 51 and the innermost part of the reproducing apparatus 30.

The upper enlarging member 51 is axially supported by bearing parts 65a and 66a provided at the upper parts of the sliders 65 and 66, at trunnions 67a and 67b provided at the left and right sides of the upper enlarging member 61. Accordingly, the upper enlarging member 61 is capable of pivoting towards the directions of arrows A1 and A2. On the other hand, the lower enlarging member 62 is also axially supported in a similar manner, to pivot in the directions of arrows B1 and B2. Trunnions 68a and 68b (only one shown) of the lower enlarging member 62 are respectively supported by bearings (not shown) provided on the lower parts of the sliders 65 and 66. The trunnions 67a, 67b, 68a, and 68b are respectively disposed on the enlarging members 61 and 62 at lateral edges, in the direction of the arrow X2. In addition, tension coil springs 69a and 69b are respectively stretched between the ends of the upper and lower enlarging members 61 and 62, to urge these enlarging members towards closing directions indicated by the arrows A1 and B1.

Furthermore, a downwardly bent part 61a is formed at the edge on the opposite side from the trunnions 67a and 67b, in the upper enlarging member 61. Two enlarging fingers 61b and 61c are provided on this downwardly bent part 61a at two positions. These enlarging fingers 61b and 61c extend towards the inserting opening 51 (in the direction of the arrow X2), at positions confronting the two cutouts 22 of the lid plate 12 of the inserted disc case 10. Similarly, the lower enlarging member 62 is also provided with a bent part 62a and enlarging fingers 62b and 62c. The two sets of enlarging fingers 61b, 61c, 62b, and 62c confront in the upward and downward directions, and mutually cooperate to carry out a jacket opening enlarging operation as will be described hereinafter. In addition, locking pins 70 and 71 are respectively provided at a central position along the right and left directions, on the upper and lower enlarging members 61 and 62. These locking pins 70 and 71 respectively fit into corresponding windows 24 and 25 in the jacket halves 13a and 13b when the jacket 11 is enlarged, to mechanically link the jacket 11 and the enlarging mechanism 31.

In addition, the upper and lower enlarging members 61 and 62 are respectively provided with rollers 72a and 72b, and rollers 73a and 73b, for rolling over the guide rails 63 and 64 to separate the enlarging members in the upward and downward directions.

When the jacket opening enlarging mechanism 31 is positioned on the side of the inserting opening 51 as shown in FIG. 2, the rollers 72a and 73a (72b and 73b) oppose the narrow part of tapered parts 63a on the front of the guide rail 63 (64). At this point, the upper enlarging member 61 is angularly rotated in the direction of the arrow A1 due to a force exerted by the tension coil springs 69a, and is in a downwardly inclined state. The lower enlarging member 62 at this point is rotated in the direction of the arrow B1, and is in an upwardly inclined state. Therefore, the bent parts 61a and 62a at the free edges of the upper and lower enlarging members 61 and 62, are pressing against each other, thereby closing the inserting opening 51 as will be understood from FIGS. 2 and 3. Thus, the upper and lower enlarging members 61 and 62 have a function of closing the inserting opening 51.

Moreover, in the above described state, the enlarging fingers 61b, 61c, 62b, and 62c mutually close upon each other, and are at a height position at the center of the inserting opening 51.

Lock levers 75 and 76 are respectively provided on the sliders 65 and 66. The lock lever 75 is substantially of an L-shape in the plan view, and is axially supported on the upper surface of the slider 65 by a pin 77, at a part in the vicinity of the bent portion of the lock lever 75. An E-shaped part 75a is formed on one arm portion of the lock lever 75. The E-shaped part 75a comprises upper and lower fingers 75b and 75c and a center finger 75d. This lock lever 75 is urged to angularly rotate clockwise by a coil spring 79 which is stretched across between the tip end part of the other arm portion of the lock lever 75 and a bracket 78 which is fixedly screwed onto the slider 65.

The lock lever 76 is of the same construction as the lock lever 75, and those parts of the lock lever 76 which are the same as those corresponding parts of the lock lever 75 have the same subscripts. The lock lever 76 is axially supported by a pin 80, and is urged to angularly rotate counterclockwise by a coil spring 82 which is stretched across between the tip end part of an arm portion of the lock lever 76 and a bracket 81 which is fixedly screwed onto the slider 66, similarly as in the case of the lock lever 75.

Figure 3:
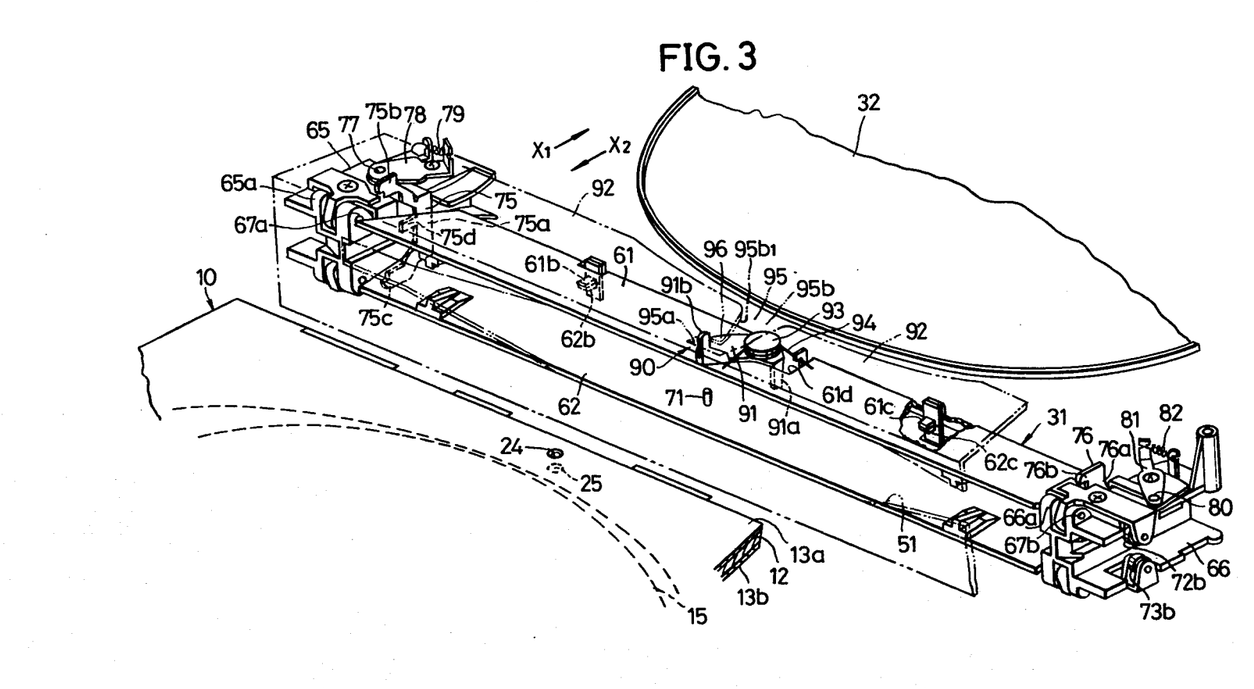
FIGS. 3, 4, and 5 are a perspective view, a plan view, and a front view, respectively showing an embodiment of a jacket opening enlarging mechanism which constitutes an essential part of the reproducing apparatus according to the present invention.
Figure 4:
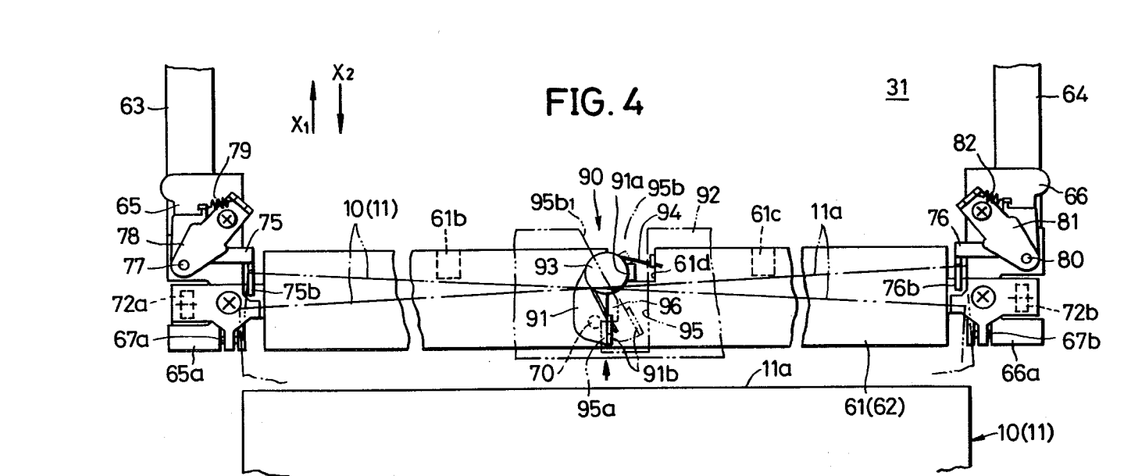
Figure 5:
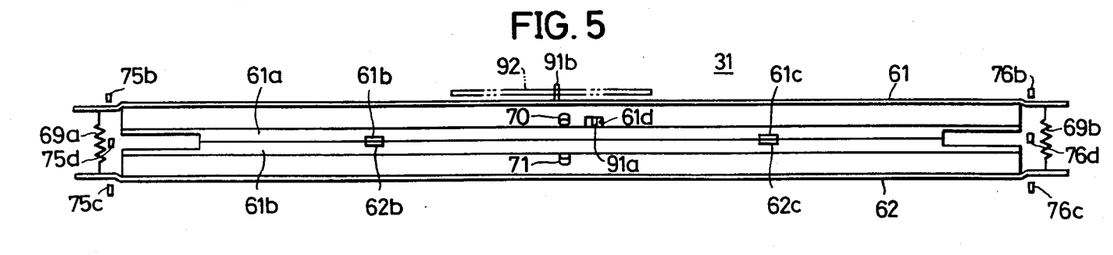

When the jacket opening enlarging mechanism 31 is positioned on the side of the inserting opening 51 as shown in FIG. 2, the lock levers 75 and 76 are at angularly rotated positions shown in FIGS. 2, 3, and 4. That is, the E-shaped parts 75a and 76a are moved in the direction of the arrow X2, and the upper fingers 75b and 76b oppose the upper surface of the upper enlarging member 61 while the lower fingers 75c and 76c oppose the lower surface of the lower enlarging member 62, to restrict the angular rotation of the enlarging members 61 and 62 in the directions of the arrows A2 and B2 (enlarging directions). As a result, the movement of the enlarging mechanism 31 towards the direction of the arrow X1 is restricted.

In addition, the center fingers 75d and 76d are inserted between the upper and lower enlarging members 61 and 62, and are at positions corresponding to the left and right ends of the front surface facing the inserting direction of the disc case 10 or jacket 11 which is inserted into the reproducing apparatus 30 through the inserting opening 51.

A locking mechanism 90 for locking the jacket opening enlarging mechanism 31, which constitutes an essential part of the apparatus according to the present invention, is provided at a position substantially center along the right and left directions on the upper enlarging member 61. This locking mechanism 90 substantially comprises a locking member 91 provided on the upper enlarging member 61, and a bracket 92 fixed to the main apparatus body, for engaging with the locking member 91.

The locking member 91 comprises a case or jacket insertion detecting arm part 91a, and a locking arm part 91b, and is provided angularly rotatable by a pin 93 at the upper surface of the upper enlarging member 61 at a position substantially center along the right and left directions thereof. The locking member 91 is urged to angularly rotate clockwise by a torsion spring 94. The detecting arm part 91a is a downwardly bent part, which penetrates through a cutout 61d of the upper enlarging member 61, to protrude into a case inserting path of the enlarging mechanism 31 formed between the upper and lower enlarging members 61 and 62. The detecting arm part 91a is provided at a position substantially center of the enlarging mechanism 31, at an inner part along the case inserting direction. By this arrangement of the detecting arm part 91a, the detecting arm part 91a is pushed by a front edge 11a of the jacket 11 on the side of the opening 23, when the disc case 10 is inserted in a normal manner, and is not pushed by the front edge 11a if the disc case 10 is inserted in a slanting manner, as will be described hereinafter. The locking arm part 91b is an upwardly bent part, and penetrates through an inner part 95a of an L-shaped cutout 95 in the bracket 92.

In a state where the locking member 91 is angularly rotated clockwise, the enlarging mechanism 31 is restricted of its movement along the direction of the arrow X1 because the locking arm part 91b becomes locked by a hook part 96. The locking member 91 assumes a state movable along the direction of the arrow X1, when the locking arm part 91b moves out from the inner part 95a of the L-shaped cutout 95 on the side of a path 95b by the counterclockwise angular rotation of the locking member 91.

Next, description will be given with respect to the operation of the enlarging mechanism 31 having the above described construction, especially regarding the operation of the locking mechanism 90.

Figure 6A:
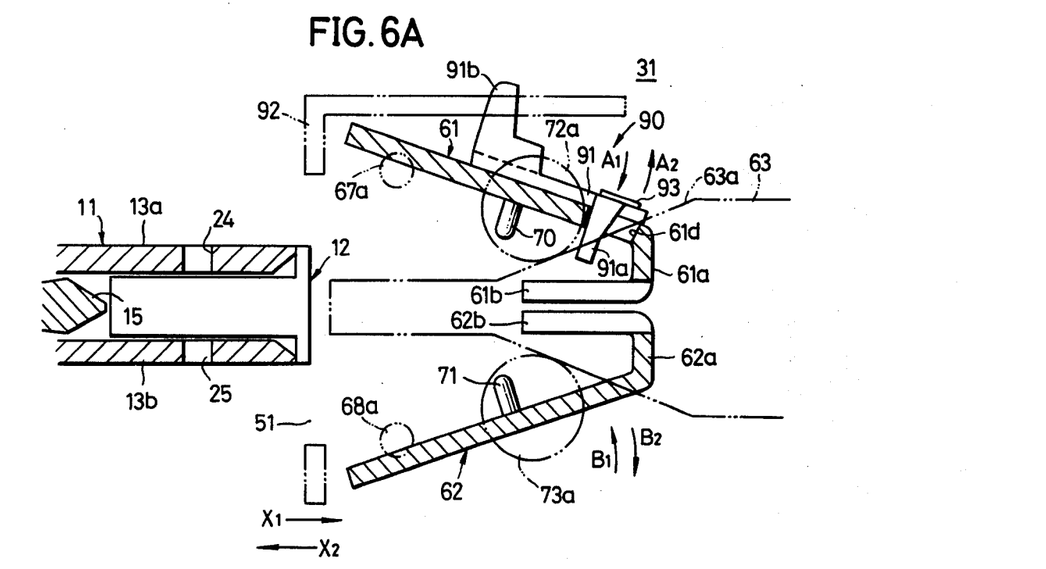
FIGS. 6A, 6B, and 6C are diagrams respectively showing the operation state of the jacket opening enlarging mechanism before and upon insertion of a disc case or jacket.
Figure 6B:
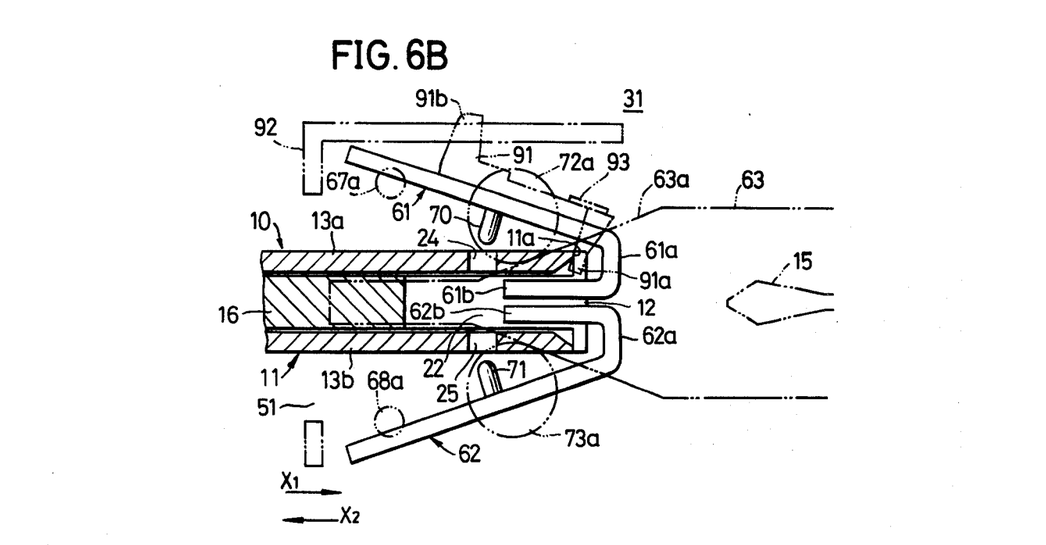

The disc case 10 is inserted into the reproducing apparatus 30 along the direction of the arrow X1, with a height position shown in FIG. 6A. When the disc case 10 is inserted in a normal position where the front edge 11a thereof is parallel with the enlarging mechanism 31, the disc case 10 enters within the innermost part of the enlarging mechanism 31. The disc case 10 and the enlarging mechanism 31 accordingly assume a state shown in FIG. 6B. That is, the enlarging fingers 61b and 62b (61c and 62c) enter within the cutouts 22 of the lid plate 12 to relatively enter within the opening 23 of the jacket 11, and the windows 24 and 25 of the jacket 11 respectively oppose the locking pins 70 and 71.

Figures 6C, 7:
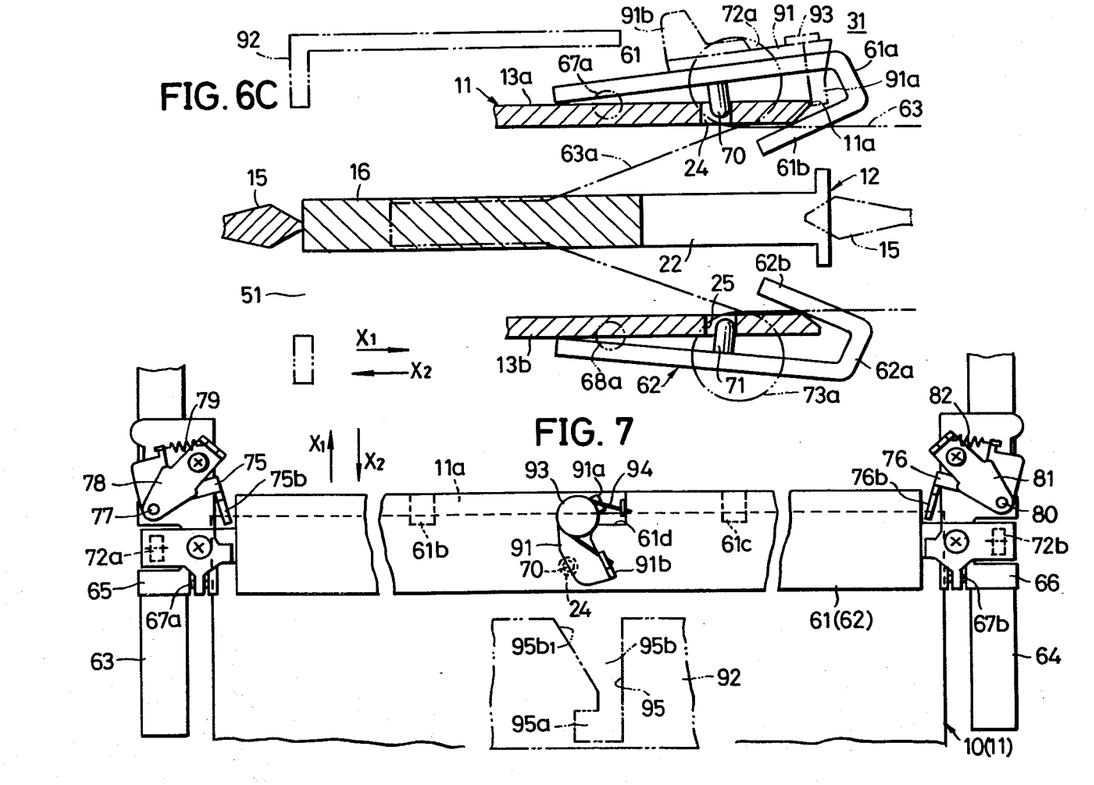
FIG. 7 is a plan view showing the operation state of particularly a locking mechanism of the jacket opening enlarging mechanism upon insertion of the disc case or jacket.

Further, the right and left end parts of the jacket 11 push the center arm parts 76d and 75d of the locking levers 76 and 75, to angularly rotate the locking levers 75 and 76 counterclockwise and clockwise, respectively, as shown in FIG. 7. Due to the angular rotation of these locking levers 75 and 76, the arm parts 75b and 76b at the upper parts thereof and the arm parts 75c and 76c at the lower parts thereof respectively separate from the positions opposing the parts in the vicinity of the right and left ends of the enlarging members 61 and 62. As a result, the enlarging members 61 and 62 assume states angularly rotatable in the enlarging directions (in the directions of the arrows A2 and B2), respectively against the forces exerted by the springs 69a and 69b, and the enlarging mechanism 31 is released of the locking at the right and left ends thereof. In addition, the center part of the front edge 11a of the jacket 11 almost simultaneously pushes the detecting arm part 91a, to angularly rotate the locking member 91 counterclockwise, as indicated by a two-dot chain line in FIG. 4 and FIG. 7. Thus, the locking arm part 91b escapes from the inner part 95a unto the path 95b. Therefore, the locking mechanism 90 is put into a lock released state.

Accordingly, the enlarging mechanism 31 is released of the locking by the right and left locking mechanisms and the central locking mechanism 90, simultaneously, and becomes movable along the direction of the arrow X1.

When the disc case 10 (jacket 11) is further inserted, the enlarging mechanism 31 moves in the direction of the arrow X1 as shown in FIGS. 6C and 7. Hence, the rollers 72a and 73a ride over the tapered parts 63a to reach the upper and lower surfaces of the guide rail 63, and the enlarging members 61 and 62 respectively rotate angularly in the directions of the arrows A2 and B2.

In the above state, the enlarging finger 61b (61c) positively locks and pulls up the jacket half 13a, and the enlarging finger 62b (62c) positively locks and pulls down the jacket half 13b. Moreover, as will be described hereinafter, the windows 24 and 25 are positively fitted with the locking pins 70 and 71, to normally enlarge the jacket opening 23 in the upward and downward directions.

The disc case 10 is thereafter inserted along the direction of the arrow X1 in the enlarged state, and only the jacket 11 is extracted in the direction of the arrow X2, to normally load the disc as previously described.

When the jacket 11 assumes the enlarged state, the windows 24 and 25 of the jacket halves 13a and 13b respectively fit over the locking pins 70 and 71 of the enlarging members 61 and 62. Accordingly, the jacket 11 and the enlarging mechanism 31 become engaged, and upon extraction of the disc case 10, the enlarging mechanism 31 is pulled back together with the jacket 11 along the direction of the arrow X2 in a state where the windows 24 and 25 are fitted over the locking pins 70 and 71.

One side surface 95b1 of the path 95b is formed as a sloping surface, so that when the enlarging mechanism 31 returns to its original position, the locking arm part 91b is guided by the above side surface 95b1 and positively enter within the L-shaped cutout 95.

Next, description will be given with respect to the operation of the locking mechanism 90, when an attempt is made to insert the disc case 10 while swiftly swinging the disc case to the right and left as described before. In the conventional apparatus, the disc case will be inserted in a state where the opening of the jacket is not enlarged under such an abnormal insertion.

If the rear end of the disc case 10 is swung towards the right in a state where the tip end thereof is inserted within the enlarging mechanism 31, the disc case 10 assumes a state indicated by a one-dot chain line in FIG. 4. On the other hand, if the disc case 10 is swung towards the left, the disc case 10 assumes a state indicated by a two-dot chain line in FIG. 4.

That is, when the disc case 10 is swung rightwards, the right lock lever 76 is pushed by the right end of the jacket 11 and assumes a locking released state. Conversely, if the disc case is swung leftwards, the left lock lever 77 is pushed by the left end of the jacket 11 and assumes a locking released state. If such a swinging operation is swiftly performed exceeding the speed with which the lock levers 76 and 77 are returned, the lock levers 76 and 77 both assume the locking released state for an instant. Hence, in the conventional apparatus, because both the lock levers 76 and 77 instantaneously assume the locking released state, the jacket 11 becomes inserted in a state where the front edge 11a thereof is slanted with respect to the longitudinal direction of the enlarging mechanism 31 as indicated by the one-dot chain line and the two-dot chain line in FIG. 4. That is, the jacket 11 becomes inserted in a state where the enlarging fingers 61b (61c) and 62b (62c) are only partially inserted or not at all inserted within the opening 23, or in a state where the windows 24 and 25 assume positions shifted from those of the corresponding locking pins 70 and 71. As a result, the jacket 11 may be inserted into the reproducing apparatus 30 in a state where the opening 23 is not at all enlarged or enlarged in an incomplete manner.

However, according to the reproducing apparatus of the present invention, the detecting arm part 91a of the locking member 91 is provided at a center position along the right and left directions of the enlarging mechanism 31, at the inner part thereof. Hence, due to this arrangement of the detecting arm part 91a, the detecting arm part 91a is not pushed by the front edge 11a of the jacket 11 upon swinging of the disc case 10 or the jacket 11 in the rightward and leftward directions, even at the extreme points of the swinging. Thus, the locking member 91 remains in the original position angularly rotated clockwise, and is maintained in the locking state. Even if the disc case 10 or the jacket 11 is inserted in an abnormal manner as described above, the enlarging mechanism 31 is locked in the vicinity of the inserting opening 31 and cannot move. As a result, the disc case 10 or the jacket 11 is prevented from being inserted into the reproducing apparatus 30 in a state where the opening 23 is not at all enlarged or enlarged in an incomplete manner. This accordingly prevents accidents upon loading and recovering of the disc, and the disc is prevented from being damaged.

The detecting arm part 91a of the locking member 91 is arranged and provided at a position away from the front edge 11a of the jacket 11 which is inserted in an abnormal manner in the plan view, as described above. In addition, the arrangement is such that when the upper enlarging member 61 of the enlarging mechanism 31 rotates angularly in the direction of the arrow A2, the detecting arm part 91a moves upwards away from the upper jacket half 13a with respect to the height direction thereof. For this reason, even if the enlarging mechanism 31 is forcibly opened in its original position due to the abnormal insertion of the disc case 10 or jacket 11, and the disc case 10 or jacket 11 passes through the enlarging mechanism 31 to enter within the reproducing apparatus, the disc case 10 will move below the detecting arm part 91a and the detecting arm part 91a will therefore not be pushed. Accordingly, the locking mechanism 90 is maintained in its original state, and the enlarging mechanism 31 remains locked in its original position by the locking mechanism 90.

Furthermore, the detecting arm part 91a of the locking member 91 protrudes downwards from the upper enlarging member 61, and is provided at the inner part. Hence, it is convenient in that the external appearance is not spoiled, because the detecting arm part 91a is hidden from the outside. Moreover, there is less chance of this detecting arm part 91a from being played in mischief. When a person is wiping the front face of the reproducing apparatus 30, for example, there is almost no possibility of his finger tips being caught by the detecting arm part, and assures safety.

The arrangement of the enlarging mechanism 31 is not limited to that described before, and the locking mechanism 90 may be provided at the center of the lower enlarging member 62 instead of the upper enlarging member 61, or provided on both the upper and lower enlarging members 61 and 62.

In addition, it should be apparent that the lock levers 75 and 76 provided on both sides of the enlarging mechanism 31 may be omitted in the reproducing apparatus according to the present invention.

Further, the present invention is not limited to these embodiments, but various variations and modifications may be made without departing from the scope of the present invention.

What is claimed is:

1. A rotary recording medium reproducing apparatus for reproducing a rotary recording medium accommodated within a case, said case having a jacket provided with a space for accommodating said rotary recording medium and an opening through which said rotary recording medium can enter and leave said jacket, and a lid member inserted through said opening of said jacket for closing said opening, said reproducing apparatus comprising:

an inserting opening through which said case is inserted;

clamping means provided at an innermost part of said reproducing apparatus, for clamping and leaving behind said rotary recording medium within said reproducing apparatus when an operation is performed in which said case is inserted into said reproducing apparatus and said jacket is then extracted from said reproducing apparatus;

a turntable for rotating said rotary recording medium left within said reproducing apparatus;

jacket opening enlarging means provided in the vicinity of said inserting opening, capable of moving above said turntable between a position in the vicinity of said inserting opening and the innermost part of said reproducing apparatus according to the insertion and extraction of said case, for engaging with said jacket to enlarge said opening according to the movement of said enlarging means towards the innermost part of said reproducing apparatus from the vicinity of said inserting opening; and locking means provided at a position substantially center along right and left directions of said enlarging means, for normally locking said enlarging means in the vicinity of said inserting opening to restrict the movement of said enlarging means towards the innermost part of said reproducing apparatus, said locking means being maintained in its original locking state upon insertion of said case or jacket in a state where a front edge of said case or jacket is slanted with respect to said enlarging means, and assuming a locking released state only when said front edge is parallel with said enlarging means and said locking means is pushed by said front edge.

2. A reproducing apparatus as claimed in claim 1 in which said jacket opening enlarging means comprises an upper enlarging member spanning the upper part of said inserting opening, said upper enlarging member being hinged along its side nearest said inserting opening and declining towards the innermost part of said reproducing apparatus, and a lower enlarging member spanning the lower part of said inserting opening, said lower enlarging member being hinged along its side nearest said inserting opening and inclining towards the innermost part of said reproducing apparatus, the upper and lower enlarging members are close to each other at their respective distal sides and cooperate to close said inserting opening, said locking means comprises a locking arm part engaging with a fixed member fixed onto said reproducing apparatus when said enlarging means is in the vicinity of said inserting opening, and a jacket insertion detecting arm part protruding within a space between said upper and lower enlarging members, for moving said locking arm part to a position away from said fixed member when said detecting arm part is pushed by said front edge of said jacket inserted through said inserting opening, and said detecting arm part is positioned at a central inner part of said space between said upper and lower enlarging members and is pushed only when said front edge of said case or jacket is inserted parallel with said upper and lower enlarging members.

3. A reproducing apparatus as claimed in claim 2 in which said jacket insertion detecting arm part shifts upwards or downwards to assume a position away from said inserted case or jacket along the height direction thereof, when respective distal ends of said upper and lower enlarging members rotate angularly so as to separate from each other.

4. A reproducing apparatus as claimed in claim 2 in which said locking arm part and said jacket insertion detecting arm part are unitarily formed on a lock member which is axially supported by said upper and lower enlarging members.

5. A reproducing apparatus as claimed in claim 4 in which said jacket insertion detecting arm part passes through an opening in said upper enlarging member to protrude within the space formed between said upper and lower enlarging members from thereabove.

6. A reproducing apparatus as claimed in claim 2 in which said fixed member comprises a locking cutout into which said locking arm part can enter, for causing said locking means to assume a locking state, and a path cutout continuing to said locking cutout, and said locking arm part which escapes from within said locking cutout moves along said cutout path together with said enlarging means.

7. A reproducing apparatus as claimed in claim 6 in which said path cutout comprises a guiding surface for guiding said locking arm part which returns together with said enlarging means upon returning of said enlarging means into said path cutout.

* * * * *